(12) United States Patent
Yasui et al.

(10) Patent No.: US 7,457,107 B2
(45) Date of Patent: Nov. 25, 2008

(54) FOLDABLE HANDY ELECTRONIC DEVICE

(75) Inventors: Kenichiro Yasui, Tokyo (JP); Mitsuru Kuroda, Tokyo (JP)

(73) Assignee: NEC Corporation, Tokyo (JP)

( * ) Notice: Subject to any disclaimer, the term of this patent is extended or adjusted under 35 U.S.C. 154(b) by 830 days.

(21) Appl. No.: 10/674,353

(22) Filed: Oct. 1, 2003

(65) Prior Publication Data
US 2004/0063474 A1    Apr. 1, 2004

(30) Foreign Application Priority Data
Oct. 1, 2002    (JP) .............................. 2002-289069

(51) Int. Cl.
*H05K 5/00* (2006.01)
*H05K 7/00* (2006.01)
*H04M 1/00* (2006.01)

(52) U.S. Cl. .................. 361/679; 361/681; 361/683; 455/575.1; 455/575.3

(58) Field of Classification Search ......... 361/679–681, 361/683; 455/575.1, 575.3
See application file for complete search history.

(56) References Cited

U.S. PATENT DOCUMENTS

| | | | | |
|---|---|---|---|---|
| 4,730,364 | A * | 3/1988 | Tat-Kee | 361/681 |
| 5,335,141 | A * | 8/1994 | Hosoi | 361/680 |
| 5,400,213 | A * | 3/1995 | Honda et al. | 361/680 |
| 5,812,116 | A * | 9/1998 | Malhi | 345/168 |
| 6,600,662 | B1 * | 7/2003 | Emmert et al. | 361/814 |
| 7,158,634 | B2 * | 1/2007 | Eromaki | 379/433.13 |
| 2002/0021250 | A1 * | 2/2002 | Asano et al. | 343/702 |
| 2002/0063690 | A1 * | 5/2002 | Chung et al. | 345/168 |
| 2002/0085338 | A1 * | 7/2002 | Lin | 361/680 |

(Continued)

FOREIGN PATENT DOCUMENTS

JP    7-131850    5/1995

(Continued)

OTHER PUBLICATIONS

Chinese Office Action dated Apr. 22, 2005 with English translation.

(Continued)

*Primary Examiner*—Jayprakash N Gandhi
*Assistant Examiner*—Anthony M Haughton
(74) *Attorney, Agent, or Firm*—McGinn IP Law Group, PLLC

(57) ABSTRACT

A foldable electronic device includes a first body having a display and a screen for protecting the display, and a second body having a plurality of operation keys. The first and second are rotatable to each other through a hinge. The first and second bodies have first and second surfaces facing each other when the electronic device is folded. The operation keys project by a height from the second surface, and the first body is formed a recess at the first surface, the recess having a depth equal to or greater than the height. The second body has a projection projecting from the second surface. The first body has an elastic piece through which the screen is mounted on the first body such that the screen moves in the recess in a depth-wise direction of the recess. The projection pushes the screen when the electronic device is folded, thereby the elastic piece being compressed, and the elastic piece pushes the screen back when the electronic device is unfolded.

19 Claims, 9 Drawing Sheets

U.S. PATENT DOCUMENTS

2008/0117570 A1 * 5/2008 Laaksonen et al. .......... 361/680

FOREIGN PATENT DOCUMENTS

| | | |
|---|---|---|
| JP | 8-9004 | 1/1996 |
| JP | 8-33027 | 2/1996 |
| JP | 8-54628 | 2/1996 |
| JP | 10-49300 | 2/1998 |
| JP | 10-336065 | 12/1998 |
| JP | 2001-186226 | 7/2001 |
| JP | 2001-274880 | 10/2001 |
| JP | 2001-308992 | 11/2001 |
| JP | 2002-132418 | 5/2002 |

OTHER PUBLICATIONS

Japanese Office Action dated Apr. 22, 2008, with partial English translation.

* cited by examiner

FOLDABLE HANDY ELECTRONIC DEVICE

BACKGROUND OF THE INVENTION

1. Field of the Invention

The invention relates to a foldable handy electronic device including an upper body and a lower body both of which are designed rotatable to each other such that the electronic device is folded and unfolded, and one of which has a display and the other has an interface through which a user can operate the electronic device.

2. Description of the Related Art

As an example of a foldable handy electronic device, a cellular phone is well known.

A foldable cellular phone is comprised generally of an upper body having a display and a speaker, and a lower body having operation keys and a microphone. After dialing, a user puts his/her ears onto a speaker of the upper body, and speaks to a microphone of the lower body.

FIG. 1 is a cross-sectional view of a conventional cellular phone.

The illustrated conventional cellular phone is comprised of a first body 1 corresponding to the above-mentioned upper body, a second body 2 corresponding to the above-mentioned lower body, and a hinge 105 connecting the first and second bodies 1 and 2 rotatably to each other. The first body 1 has a first surface facing the second body 2 when the cellular phone is folded, and the second body 2 has a second surface facing the first body 1 when the cellular phone is folded. The first body 1 includes a display 3 at the first surface, and a screen 5 arranged above the display 3 for protecting the display 3. The second body 2 includes an interface 6 at the second surface. The interface 6 includes a plurality of operation keys 7 arranged on the second surface.

The first body 1 includes a front case 101 facing the second body 2 when the cellular phone is folded, and a rear case 102. Similarly, the second body 2 includes a front case 103 facing the first body 1 when the cellular phone is folded, and a rear case 104.

By rotating the first body 1 by about 180 degrees relative to the second body 2, the display 3 and the interface 6 are exposed to a user such that the user can look at the display 3 and operate the cellular phone through the interface 6. By rotating the first body 1 relative to the second body 2 so that the cellular phone is folded as illustrated in FIG. 1, the display 3 and the interface 6 are hidden, and hence, they are protected from being damaged, even if a user drops the cellular phone.

FIG. 2 is an enlarged view of an encircled portion A of the cellular phone.

As illustrated in FIG. 2, the operation keys 7 and the screen 5 are kept spaced away from each other by a clearance S1 such that they do not interfere with each other when the cellular phone is folded.

In the conventional cellular phone illustrated in FIG. 2, the display 3 and the interface 6 face each other when the cellular phone is folded. If the clearance S is not sufficient, the operation keys 7 of the interface 6 would interfere with the display 3 when the hinge 105 is worn out in long use, resulting in that the display 3 is damages at a surface thereof.

If the operation keys 7 are designed to be small in height, it would be possible to keep the clearance S sufficient between the display 3 and the operation keys 7. However, a user might fail to sufficiently compress the operation keys 7, resulting in that a user could not correctly operate the cellular phone.

Japanese Patent Application Publication No. 2001-308992 has suggested a cellular phone including a first body, a second body, and a hinge through which the first and second bodies are rotatably connected to each other. The second body includes a main display. An auxiliary display is arranged in the hinge. The auxiliary display is always exposed regardless of whether the cellular phone is folded or unfolded.

Japanese Patent Application Publication No. 2001-274880 has suggested a cellular phone including a first body, a second body, and a hinge through which the first and second bodies are rotatably connected to each other. The second body includes a main display. An auxiliary display is arranged in the hinge. The auxiliary display is always exposed regardless of whether the cellular phone is folded or unfolded. Received data is displayed in the auxiliary display, being scrolled every predetermined period of time.

Japanese Patent Application Publication No. 2001-186226 has suggested a cellular phone including a first body, a second body, and a hinge through which the first and second bodies are rotatably connected to each other. The first body is designed to have a first liquid crystal display device at a front thereof, and a second liquid crystal display device at a rear thereof.

Japanese Patent Application Publication No. 10-336065 has suggested a cellular phone including a first body, a second body, and a hinge through which the first and second bodies are rotatably connected to each other. The first body includes a speaker, and the second body includes a microphone, operation keys, a substrate on which radio-signal circuits are mounted, and a display.

Japanese Patent Application Publication No. 8-33027 has suggested a cellular phone including a first body, a second body, and a hinge through which the first and second bodies are rotatably connected to each other. The cellular phone is designed to be unfolded in one action of a user.

Japanese Patent Application Publication No. 8-9004 has suggested a cellular phone including a first body, a second body, and a hinge through which the first and second bodies are rotatably connected to each other. The cellular phone is designed to be unfolded, to extend an antenna, and to be put into an off-hook condition in one action of a user.

Japanese Patent Application Publication No. 7-131850 has suggested a cellular phone including a first body, a second body, and a hinge through which the first and second bodies are rotatably connected to each other. The cellular phone is designed to be unfolded by one hand of a user.

SUMMARY OF THE INVENTION

In view of the above-mentioned problems in the conventional handy electronic devices such as a cellular phone, it is an object of the present invention to provide an electronic device in which a display and an interface are kept sufficiently spaced away from each other to avoid them to interfere with each other, and which enables a user to sufficiently compress operation keys such that a user could correctly operate an electronic device.

In one aspect of the present invention, there is provided a foldable electronic device including a first body having a display and a second body having an interface through which a user can operate the electronic device, the first and second bodies being rotatable to each other through a hinge, the first body having a first surface facing the second body when the electronic device is folded, the second body having a second surface facing the first body when the electronic device is folded, the interface projecting by a height from the second surface, the first body being formed a recess with the first surface, the recess aligning with the interface when the electronic device is folded, and having a depth equal to or greater than the height, and the display being located within the recess.

There is further provided a foldable electronic device including a first body having a display and a screen for protecting the display, and a second body having an interface through which a user can operate the electronic device, the interface including a plurality of operation keys, the first and second bodies being rotatable to each other through a hinge, the first body having a first surface facing the second body when the electronic device is folded, the second body having a second surface facing the first body when the electronic device is folded, the operation keys projecting by a height from the second surface, the first body being formed a recess at the first surface, the recess aligning with the operation keys when the electronic device is folded, and having a depth equal to or greater than the height, the second body having at least one projection projecting from the second surface, the first body having an elastic piece through which the screen is mounted on the first body such that the screen moves in the recess in a depth-wise direction of the recess, the projection pushing the screen in the depth-wise direction when the electronic device is folded, thereby the elastic piece being compressed, and the elastic piece pushing the screen back when the electronic device is unfolded.

For instance, the elastic piece may be sandwiched between the screen and the display. As an alternative, the elastic piece may be sandwiched between the screen and the first body.

For instance, the screen and the display may be fixed to each other.

It is preferable that the first body is formed with a hole into which the projection is inserted when the electronic device is folded, the projection pushing the screen through the hole when the electronic device is folded.

It is preferable that the second body has two projections projecting from the second surface such that the projections push the screen at opposite sides of the screen.

It is preferable that the screen has a thicker portion than the rest thereof, the projection pushing the screen at the thicker portion.

It is preferable that the elastic piece is located around the recess.

It is preferable that the elastic piece is fixedly adhered to the screen.

For instance, the foldable electronic device is a cellular phone.

The advantages obtained by the aforementioned present invention will be described hereinbelow.

In the foldable electronic device in accordance with the present invention, it is possible to prevent a display and an interface from interfering with each other when the electronic device is folded, ensuring that the display is not damaged.

In addition, since operation keys of an interface can be designed sufficiently tall, a user can operate the electronic device without failure.

Furthermore, since a screen moves in a depth-wise direction of a recess as the electronic device is folded or unfolded, it is possible to prevent a display and an interface from interfering with each other, and operation keys of an interface can be designed sufficiently tall.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

In the embodiments mentioned below, the foldable electronic device in accordance with the present invention is applied to a cellular phone. However, it should be noted that the foldable electronic device in accordance with the present invention may be applied to other handy communication-making terminals such as a personal digital assistant (PDA).

First Embodiment

Figure 1:
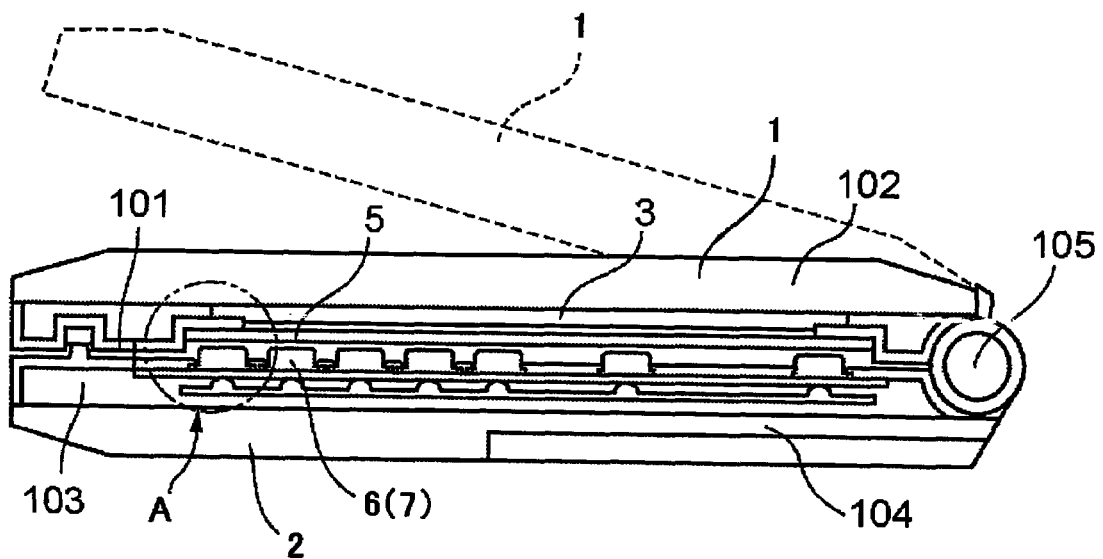
FIG. 1 is a cross-sectional view of a conventional cellular phone.
Figure 2:
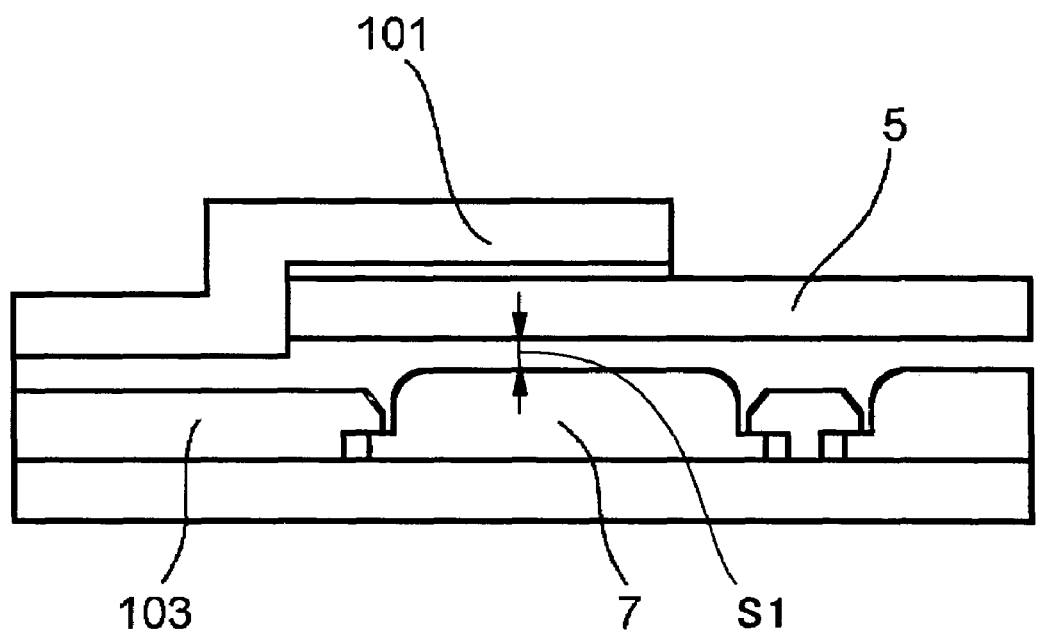
FIG. 2 is an enlarged view of an encircled portion A in FIG. 1.
Figure 3:
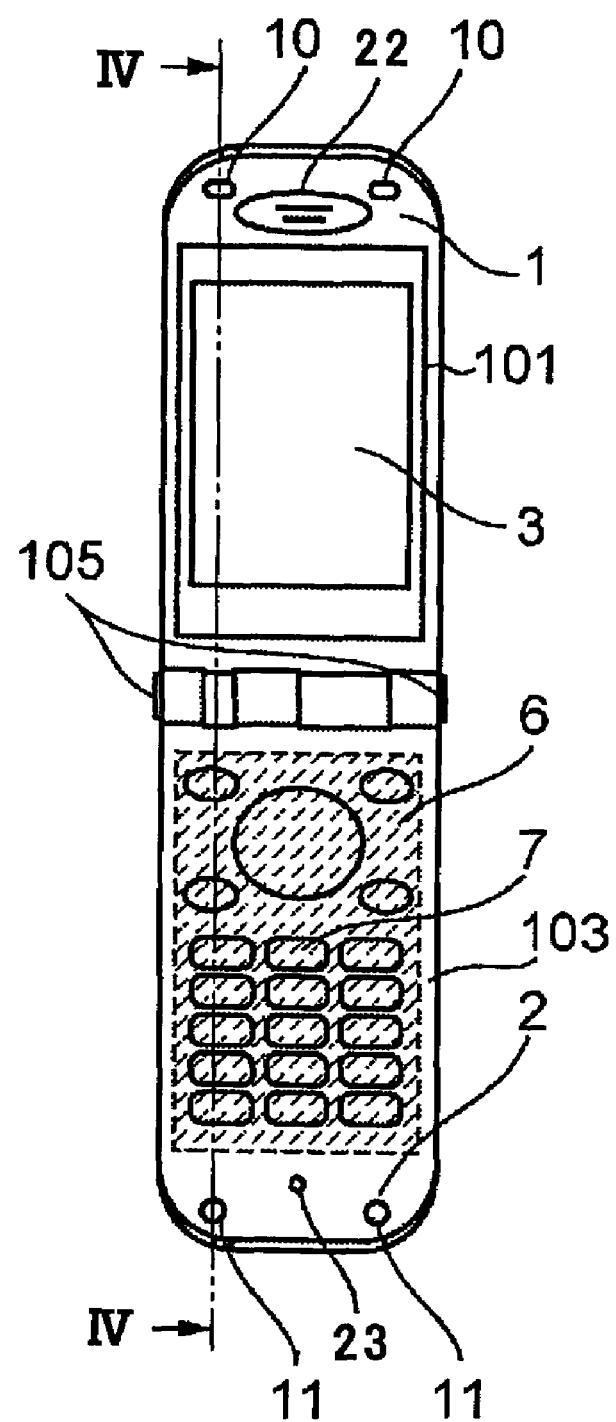
FIG. 3 is a front view of a cellular phone in accordance with the first embodiment of the present invention.
Figure 4:
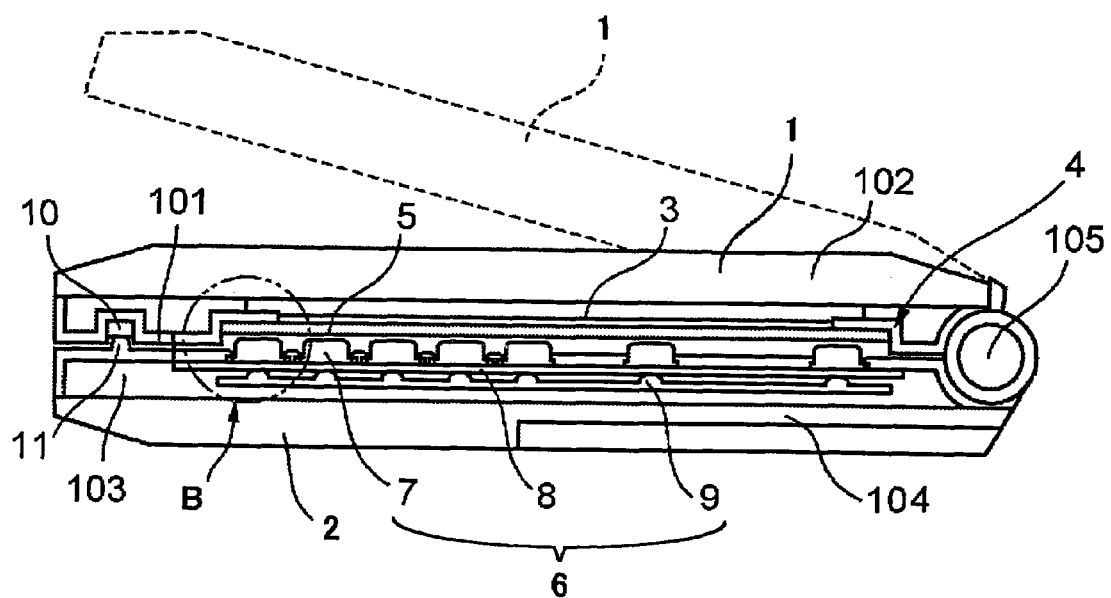
FIG. 4 is a cross-sectional view taken along the line IV-IV in FIG. 3, showing that the cellular phone illustrated in FIG. 3 is folded.
Figure 5:
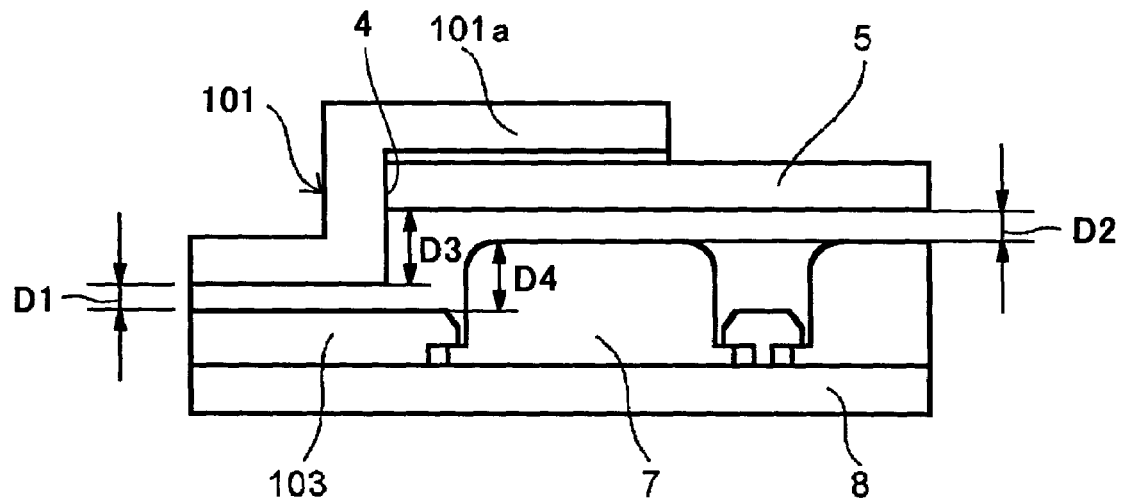
FIG. 5 is an enlarged view of an encircled portion B in FIG. 4.

FIGS. 3 to 5 illustrate a cellular phone in accordance with the first embodiment of the present invention. FIG. 3 is a front view of the cellular phone in accordance with the first embodiment, FIG. 4 is a cross-sectional view taken along the line IV-IV in FIG. 3, showing that the cellular phone is folded, and FIG. 5 is an enlarged view of the encircled portion B in FIG. 4.

With reference to FIG. 3, the cellular phone is comprised of a first body 1 and a second body 2. The first and second bodies 1 and 2 are rotatably connected to each other through a hinge 105. The hinge 105 may be a separate part from the first and second bodies 1 and 2, or a part of the first and second bodies 1 and 2 may define the hinge 105.

As best illustrated in FIG. 4, the first body 1 is comprised of a front case 101 facing the second body 2 when the cellular phone is folded, and a rear case 102 exposed outside even when the cellular phone is folded. Similarly, the second body 2 is comprised of a front case 103 facing the first body 1 when the cellular phone is folded, and a rear case 104 exposed outside even when the cellular phone is folded.

As illustrated in FIG. 3, the first body 1 includes a display 3, a screen 5 (see FIG. 4) mounted above the display 3 for protecting the display 3, a pair of cushions 10, and a speaker 22.

For instance, the display 3 is comprised of a thin liquid crystal display (LCD) device or a thin organic electroluminescence (EL) display for displaying communication data and/or characters.

The second body 2 includes an interface 6 through which a user operates the cellular phone, a pair of projections 11 which make contact with the cushions 10 when the cellular phone is folded, and a microphone 23. As best illustrated in FIG. 4, the interface 6 is comprised of a plurality of operation keys 7 arranged a surface of the front case 103 of the second body 2, a rubber sheet 8 on which the operation keys 7 are mounted, and a dome sheet 9 having a plurality of dome-shaped buttons arranged just below the operation keys 7 through the rubber sheet 8.

As illustrated in FIG. 4, the front case 101 of the first body 1 is formed with an opening through which the display 3 is exposed. In addition, the first body 1 is formed with a recess 4 around the opening. In other words, the opening through which the display 3 is exposed is located at the bottom of the recess 4. The screen 5 is fixed at the bottom of the recess 4 such that the screen 5 is located slightly above and in alignment with the display 3.

After the display 3 is fixedly fit into the recess 4 formed at the front case 101, the screen 5 is fixed to the recess 4. The display 3 may be fixed to the recess 4 by means of screws at a bottom of the recess 4, or by adhering the display 3 onto a bottom of the recess 4.

The recess 4 has an area sufficient for covering the operation keys 7 when the cellular phone is folded. In addition, the recess 4 has a depth sufficient for ensuring a clearance between a surface of the screen 5 and tops of the operation keys 7.

The screen 5 protects the display 3 from being damaged and/or contaminated. The screen 5 has such transparency that a user can observe what is displayed in the display 3. To this end, it is preferable that the screen 5 is larger in size than the display 3.

However, the cellular phone may be designed not to include the screen 5, because the cellular phone is folded during not used, and hence, the display 3 is scarcely damaged, and further because the display 3 is always kept away from the interface 6 in the cellular phone in accordance with the first embodiment.

As mentioned earlier, the second body 2 is comprised of the front case 103 and the rear case 104.

The front case 103 is formed with one or more openings through which a user operate the operations keys 7. If the interface 6 is entirely exposed, the front case 103 is designed to have an opening through which the interface 6 is exposed. If the operation keys 7 are individually exposed, the front case 103 is designed to have openings in the same number as the number of the operation keys 7.

As mentioned above, the interface 6 is comprised of the operation keys 7, the rubber sheet 8, and the dome sheet 9. If a certain operation key 7 is pushed down, a dome-shaped button associated with the operation key 7 is pushed down, and thus, a signal is transmitted to an internal circuit (not illustrated) from the dome-shaped button. The interface 6 is fixed to the front case 103 at the rear of the interface 6 such that a user can operate the operation keys 7 at a front of the front case 103.

By rotating the first and second bodies 1 and 2 from a state where the cellular phone is unfolded as illustrated in FIG. 3, the cellular phone is folded, as illustrated in FIG. 4. The front case 101 of the first body 1 is formed with two recesses outside the recess 4, and the cushions 10 composed of elastic material are kept compressed into the recesses. The front case 103 of the second body 2 is formed with two projections 11 in alignment with the cushions 10. When the cellular phone is folded, the projections 11 make contact with the cushions 10, so that the front cases 101 and 103 are prevented from being damaged due to interference with each other.

FIG. 5 is an enlarged view of the encircled portion B in FIG. 4.

As illustrated in FIG. 5, the recess 4 is formed at the bottom thereof with a mold 101a onto which the display 3 is to be fixed.

A depth of the recess 4 is dependent on a projecting length of the operation keys 7. Now assuming that a clearance made between the front case 101 of the first body 1 and the front case 103 of the second body 2 when the cellular phone is folded is expressed as "D1", a clearance made between the operation keys 7 and the screen 5 when the cellular phone is folded is expressed as "D2", a clearance made between a surface of the front case 101, closer to the second body 2, and the screen 5 is expressed as "D3", and a clearance made between the front case 103 of the second body 2 and the tops of the operation keys 7 is expressed as "D4", the following relation is established.

$$D1+D3=D2+D4$$

The clearance D1 becomes smaller as the cushions 10 are degraded because of long use. Even if the clearance D1 becomes zero, that is, the front case of the first body 1 makes direct contact with the front case 103 of the second body 2, it would be necessary to prevent the display 3 from being damaged due to direct contact between the operation keys 7 and the screen 5.

If the clearance D2 is designed greater than the clearance D1 (D2>D1), the clearance D3 would be greater than the clearance D4 (D3>D4), preventing the display 3 from being damaged at a surface thereof.

As mentioned above, the front case 101 of the first body 1 is formed with the recess 4 aligning with the interface when the electronic device is folded, and having a depth sufficient for absorbing a height of the operation keys 7. The display 3 is arranged in the recess 4. Accordingly, the display 3 and the interface 6 are kept sufficiently spaced away from each other to avoid them to interfere with each other, and a user can sufficiently compress the operation keys 7 to correctly operate the cellular phone.

Second Embodiment

FIGS. 6, 7A, 7B, 8A and 8B illustrate a cellular phone in accordance with the second embodiment of the present invention.

Figure 6:
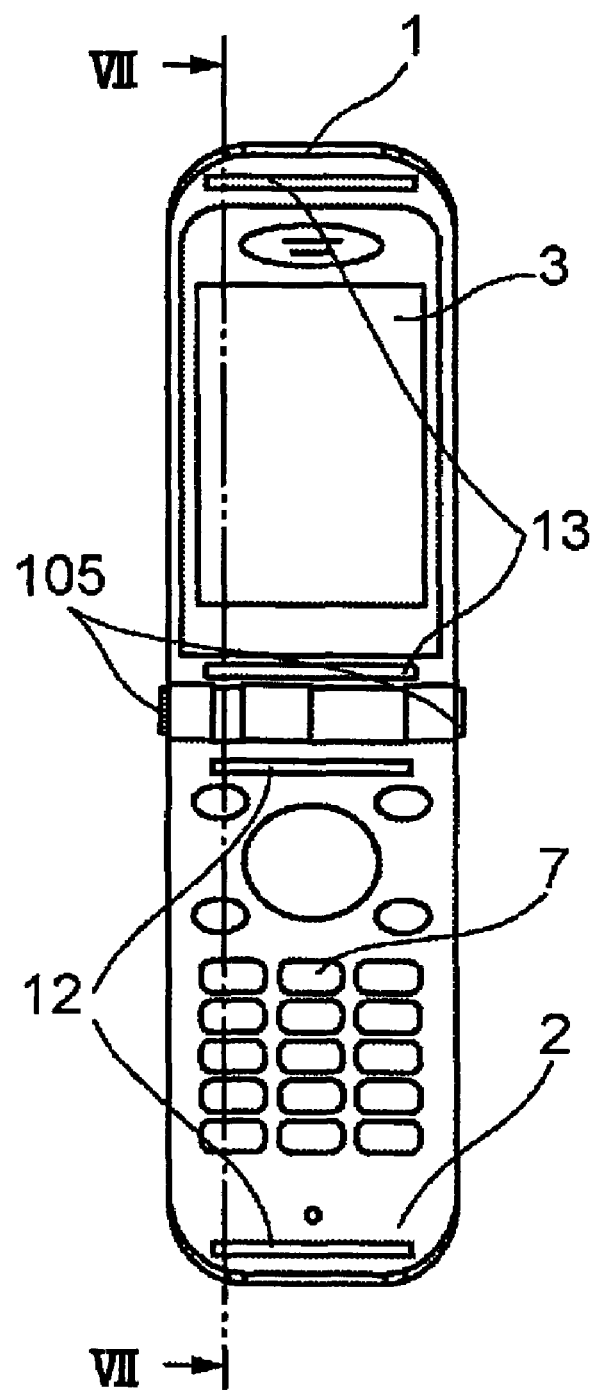
FIG. 6 is a front view of a cellular phone in accordance with the second embodiment of the present invention.
Figure 7A:
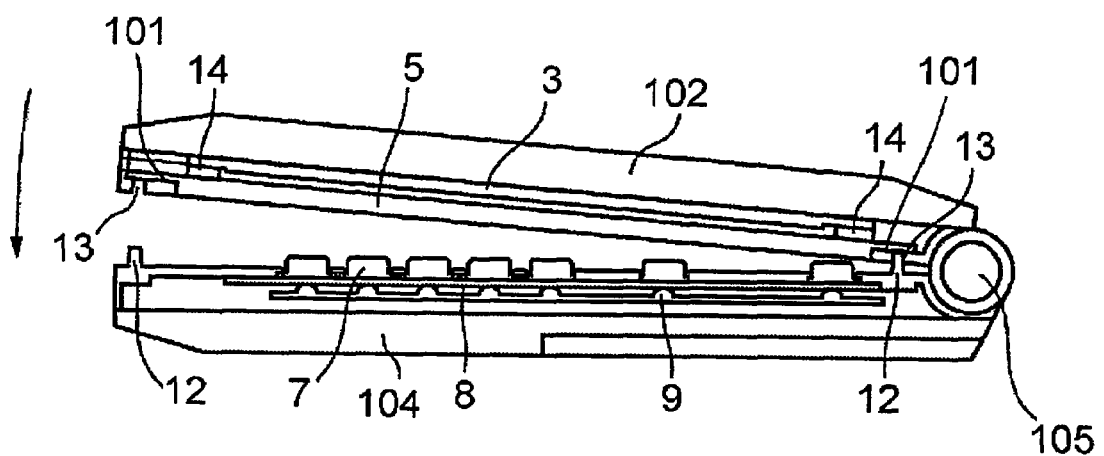
FIG. 7A is a cross-sectional view taken along the line VII-VII in FIG. 6, showing that the cellular phone illustrated in FIG. 6 is almost folded.
Figure 7B:
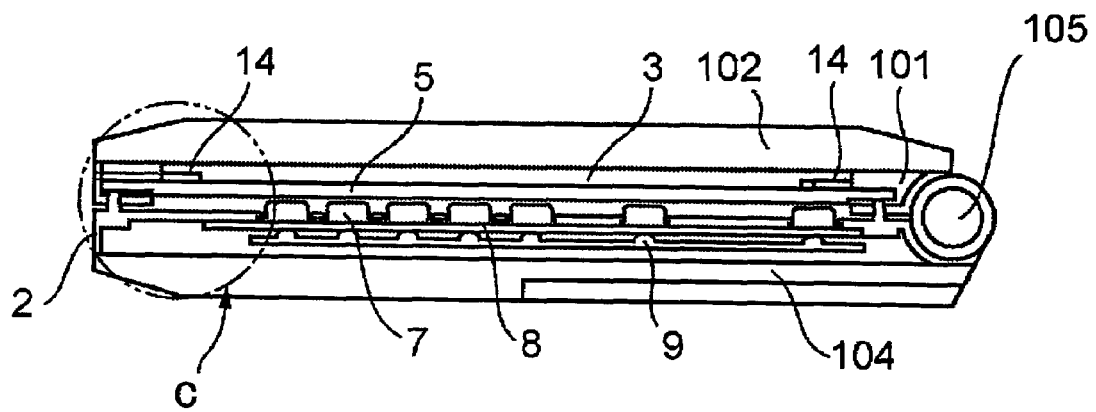
FIG. 7B is a cross-sectional view taken along the line VII-VII in FIG. 6, showing that the cellular phone illustrated in FIG. 6 is completely folded.
Figure 8A:
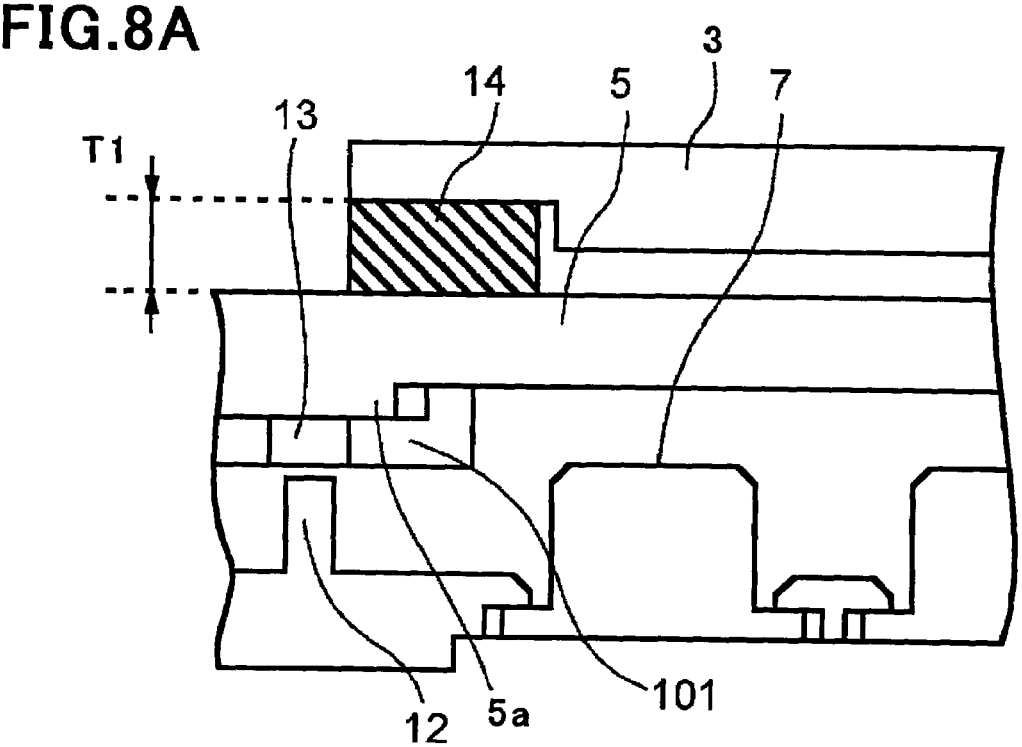
FIG. 8A is an enlarged view of an encircled portion C in FIG. 7B.
Figure 8B:
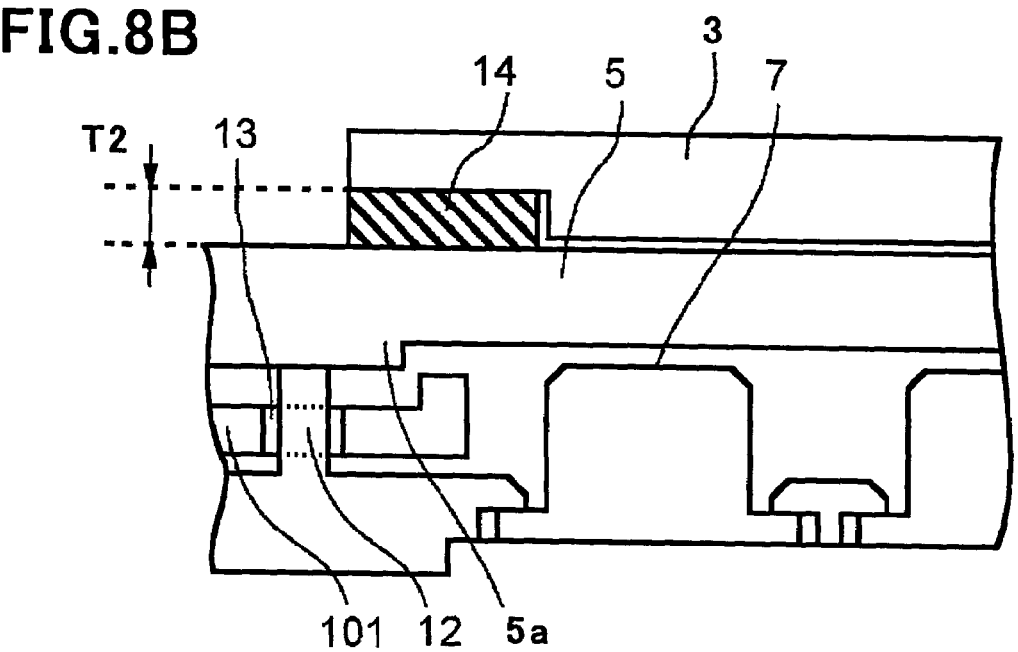
FIG. 8B is an enlarged view of an encircled portion C in FIG. 7B.

FIG. 6 is a front view of the cellular phone in accordance with the second embodiment, FIG. 7A is a cross-sectional view taken along the line VII-VII in FIG. 6, showing that the cellular phone is almost folded, FIG. 7B is a cross-sectional view taken along the line VII-VII in FIG. 6, showing that the cellular phone is completely folded, and FIGS. 8A and 8B are enlarged views of an encircled portion C in FIG. 7B.

The cellular phone in accordance with the second embodiment is structurally different from the cellular phone in accordance with the first embodiment in that, as best illustrated in FIG. 6, the second body 2 in the second embodiment is formed with two elongate projections 12, and the first body 1 in the second embodiment is formed with two elongate holes 13 into which the projections 12 are fit when the cellular phone is folded, and further that a packing 14 is sandwiched between the display 3 and the screen 5, as illustrated in FIGS. 8A and 8B.

The projections 12 extend in parallel with and in the vicinity of shorter edges of the second body 2, and the elongate holes 13 are arranged around the display 3 in the vicinity of shorter edges of the first body 1.

The cellular phone in accordance with the second embodiment has the same structure as the cellular phone in accordance with the first embodiment except the above-mentioned projections 12, holes 13 and packing 14. Parts or elements that correspond to the first embodiment have been provided with the same reference numerals, and operate in the same manner as corresponding parts or elements in the first embodiment, unless explicitly explained hereinbelow.

As illustrated in FIGS. 8A and 8B, the screen 5 is designed to have a size to extend beyond the holes 13.

The screen 5 in the second embodiment is designed to have stiffness to some degree unlike the screen 5 in the first embodiment. This is because the screen 5 has to transfer a stress given from the projections 12 when the cellular phone is folded, to the packing 14, as mentioned later in detail, and further because if the screen 5 is deformed due to repeated application of stress to the screen 5, a user would have difficulty in reading what is displayed in the display 3.

Hence, the screen 5 in the second embodiment is designed to have a thicker portion 5a than the rest of the screen 5. The projections 12 make abutment with the screen 5 at the thicker portion 5a when the cellular phone is folded.

In place of forming the thicker portion 5a, a piece composed of material having high stiffness may be adhered to the screen 5 such that the projections 12 make abutment with the piece.

The projections 12 may be integrally formed with the second body 2 by molding. As an alternative, the projections 12 as separate parts may be fixedly adhered to the second body 2.

The packing 14 is composed of elastic material, and is fixedly adhered to the display 3 such that the packing 14 extends around the recess 4. The packing 14 is fixedly adhered further to the screen 5.

Hereinbelow is explained an operation of the cellular phone in accordance with the second embodiment, with reference to FIGS. 7A, 7B, 8A and 8B.

By rotating the first and second bodies 1 and 2 relative to each other, the cellular phone is folded or unfolded.

When the cellular phone is folded, the projections 12 are kept inserted into the elongate holes 13 to make abutment with the screen 5, resulting in that the projections 12 exert compressive force on the screen 5. While such compressive force acts on the screen 5, the compressive force acts also on the packing 14 fixed to the screen, and hence, the packing 14 composed of elastic material is compressed, as illustrated in FIG. 8B. As a result, the screen 5 is pushed towards the rear case 102 of the first body 1, ensuring a clearance between the operation keys 7 and the screen 5.

When the cellular phone is unfolded, the projections 12 are pulled out of the elongate holes 13, and hence, the compressive force does no longer act on the screen 5. The packing 14 stores elastic energy therein while compressed. The elastic energy stored in the packing 14 causes the screen 5 to expand towards the front case 101 of the first body 1.

With reference to FIG. 8A, when the cellular phone is unfolded, the packing 14 has a thickness of T1, and causes the screen 5 to make contact with the front case 101 of the first body 1. When the cellular phone is folded, the clearance D3 (see FIG. 5) is smaller than the clearance D4 (see FIG. 5).

In contrast, when the cellular phone is folded, the projections 12 exert compressive force on the screen 5, and the compressive force is transferred to the packing 14 through the screen 5. As a result, as illustrated in FIG. 8B, a thickness of the packing 14 is shortened to the thickness T2 from the thickness T1. Hence, the clearance D3 is increased by a difference between the thicknesses T1 and T2, that is, by (T1-T2). Thus, the clearance D3 becomes greater than the clearance D4 defined as a clearance between the front case 103 of the second body 2 and the tops of the operation keys 7. This ensures that the screen 5 does no longer interfere with the operation keys 7, and accordingly, the screen is no longer damaged at a surface thereof.

Third Embodiment

Figure 9:
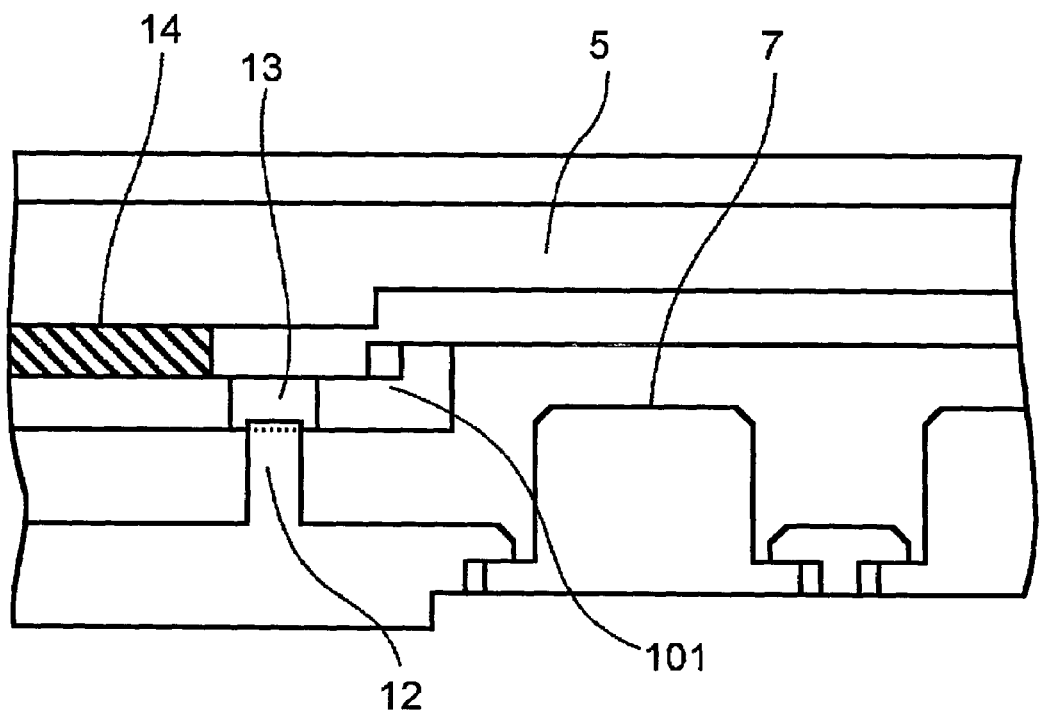
FIG. 9 is a partial cross-sectional view of a cellular phone in accordance with the third embodiment of the present invention.

FIG. 9 is a cross-sectional view of a cellular phone in accordance with the third embodiment of the present invention.

In the cellular phone in accordance with the second embodiment, the packing 14 is fixedly adhered to the display 3, as illustrated in FIGS. 8A and 8B. It should be noted that the packing 14 may be adhered to anywhere, if the packing 14 is compressed directly or indirectly by the projections 12 when the cellular phone is folded. In the third embodiment, as illustrated in FIG. 9, the packing 14 is fixedly adhered to the front case 101 of the first body 1.

The cellular phone in accordance with the third embodiment has the same structure as that of the cellular phone in accordance with the second embodiment except the location of the packing 14.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2002-289069 filed on Oct. 1, 2002 including specification, claims, drawings and summary is incorporated herein by reference in its entirety.

What is claimed is:

1. A foldable electronic device including a first body having a display covered by a screen and a second body having an interface through which a user can operate said electronic device, said first body and said second body being rotatable to each other through a hinge, said first body having a first surface facing said second body when said electronic device is folded, said second body having a second surface facing said first body when said electronic device is folded, said interface projecting by a height from said second surface, said first body comprising a recess with said first surface, said recess aligning with said interface when said electronic device is folded, and having a depth equal to or greater than said height, and said display and said screen being located within said recess, wherein said recess extends along an entire length of said interface.

2. The foldable electronic device as set forth in claim 1, wherein said electronic device comprises a cellular phone.

3. The foldable electronic device according to claim 1, wherein said interface comprises a plurality of operation keys.

4. The foldable electronic device according to claim 3, wherein said operation keys are received into said recess when said electronic device is folded to reduce a space between said first body and said second body.

5. The foldable electronic device according to claim 1, wherein said first body comprises at least one second recess.

6. A foldable electronic device including a first body having a display and a screen for protecting said display, and a second body having an interface through which a user can operate said electronic device, said interface including a plurality of operation keys, said first body and said second body being rotatable to each other through a hinge, said first body having a first surface facing said second body when said electronic device is folded, said second body having a second surface facing said first body when said electronic device is folded, said operation keys projecting by a height from said second surface, said first body comprising a recess at said first surface, said recess aligning with said operation keys when said electronic device is folded, and having a depth equal to or greater than said height, said second body having at least one projection projecting from said second surface, said first body having an elastic piece through which said screen is mounted on said first body such that said screen moves in said recess in a depth-wise direction of said recess, said projection pushing said screen in said depth-wise direction when said electronic device is folded, thereby said elastic piece being compressed, and said elastic piece pushing said screen back when said electronic device is unfolded.

7. The foldable electronic device as set forth in claim 6, wherein said elastic piece is sandwiched between said screen and said display.

8. The foldable electronic device as set forth in claim 6, wherein said elastic piece is sandwiched between said screen and said first body.

9. The foldable electronic device as set forth in claim 6, wherein said screen and said display are fixed to each other.

10. The foldable electronic device as set forth in claim 6, wherein said first body comprises a hole into which said projection is inserted when said electronic device is folded, said projection pushing said screen through said hole when said electronic device is folded.

11. The foldable electronic device as set forth in claim 6, wherein said second body comprises two projections projecting from said second surface such that said projections push said screen at opposite sides of said screen.

12. The foldable electronic device as set forth in claim 6, wherein said screen comprises a thicker portion than the rest thereof, said projection pushing said screen at said thicker portion.

13. The foldable electronic device as set forth in claim 6, wherein said elastic piece is located around said recess.

14. The foldable electronic device as set forth in claim 6, wherein said elastic piece is fixedly adhered to said screen.

15. The foldable electronic device as set forth in claim 6, wherein said electronic device comprises a cellular phone.

16. A foldable electronic device including a first body having a display covered by a screen and a second body having an interface through which a user can operate said electronic device, said first body and said second body being rotatable to each other through a hinge, said first body having a first surface facing said second body when said electronic device is folded, said second body having a second surface facing said first body when said electronic device is folded, said interface projecting by a height from said second surface, said first body comprising a recess with said first surface, said recess aligning with said interface when said electronic device is folded, and having a depth equal to or greater than said height, and said display and said screen being located within said recess, wherein said first body comprises at least one second recess, wherein said second body comprises at least one projection projecting from an inner surface of said second body, and wherein said at least one projection is received by said at least one second recess.

17. A foldable electronic device including a first body having a display covered by a screen and a second body having an interface through which a user can operate said electronic device, said first body and said second body being rotatable to each other through a hinge, said first body having a first surface facing said second body when said electronic device is folded, said second body having a second surface facing said first body when said electronic device is folded, said interface projecting by a height from said second surface, said first body comprising a recess with said first surface, said recess aligning with said interface when said electronic device is folded, and having a depth equal to or greater than said height, and said display and said screen being located within said recess, and wherein said first body comprises at least one second recess, said foldable electronic device further comprising an elastic member formed in said at least one second recess.

18. A foldable electronic device including a first body having a display and a second body having an interface through which a user can operate said electronic device, said first body and said second body being rotatable to each other through a hinge, said first body having a first surface facing said second body when said electronic device is folded, said second body having a second surface facing said first body when said electronic device is folded, said interface comprising a plurality of operation keys projecting by a height from said second surface, said first body comprising a recess with said first surface, said recess aligning with said interface when said electronic device is folded, and having a depth equal to or greater than said height, said operation keys being received into said recess when said electronic device is folded to reduce a space between said first body and said second body and said display and said screen being located within said recess, wherein said recess extends alone an entire length of said interface.

19. A foldable electronic device including a first body having a display and a screen for protecting said display, and a second body having an interface through which a user can operate said electronic device, said first body and said second body being rotatable to each other through a hinge, said first body having a first surface facing said second body when said electronic device is folded, said second body having a second surface facing said first body when said electronic device is folded, said first body comprising a recess, said second body having at least one projection projecting from said second surface, said first body having an elastic piece through which said screen is mounted on said first body such that said screen moves in said recess in a depth-wise direction of said recess, said projection pushing said screen in said depth-wise direction when said electronic device is folded, thereby said elastic piece being compressed, and said elastic piece pushing said screen back when said electronic device is unfolded.

* * * * *